United States Patent

Allen

(10) Patent No.: US 8,195,356 B2
(45) Date of Patent: Jun. 5, 2012

(54) METHODS FOR TESTING AN IMAGE BASED OCCUPANT CLASSIFICATION SYSTEM

(75) Inventor: Brian T. Allen, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 908 days.

(21) Appl. No.: 12/247,540

(22) Filed: Oct. 8, 2008

(65) Prior Publication Data

US 2010/0087982 A1 Apr. 8, 2010

(51) Int. Cl.
*G01M 17/00* (2006.01)
(52) U.S. Cl. ............ 701/32.8; 701/29.8; 701/30.3; 701/33.1
(58) Field of Classification Search ............ 701/31, 701/45, 29.8, 30.3, 32.8, 33.1; 702/116; 703/8, 17; 340/438; 280/735; 382/100, 382/103, 104, 105, 159, 160, 165, 169, 170, 382/181, 224, 225, 226, 227, 228; 700/47, 700/50; 706/15, 19, 20, 22, 41
See application file for complete search history.

(56) References Cited

U.S. PATENT DOCUMENTS

| | | | |
|---|---|---|---|
| 4,885,566 A | 12/1989 | Aoki et al. | |
| 5,164,901 A * | 11/1992 | Blackburn et al. | 701/47 |
| 5,187,465 A | 2/1993 | Stonerook et al. | |
| 5,330,226 A | 7/1994 | Gentry et al. | |
| 5,440,913 A | 8/1995 | Crispin et al. | |
| 5,528,698 A * | 6/1996 | Kamei et al. | 382/100 |
| 5,726,887 A | 3/1998 | Spies et al. | |
| 5,785,347 A | 7/1998 | Adolph et al. | |
| 5,927,752 A | 7/1999 | Brandin | |
| 5,983,147 A * | 11/1999 | Krumm | 701/45 |
| 6,104,878 A * | 8/2000 | Toguchi et al. | 396/52 |
| 6,151,540 A | 11/2000 | Anishetty | |
| 6,203,059 B1 | 3/2001 | Mazur et al. | |
| 6,218,739 B1 | 4/2001 | Fendt | |
| 6,313,739 B1 * | 11/2001 | Roth et al. | 340/426.26 |
| 6,459,974 B1 * | 10/2002 | Baloch et al. | 701/45 |
| 6,598,900 B2 | 7/2003 | Stanley et al. | |
| 6,771,175 B1 | 8/2004 | Eagle et al. | |
| 6,781,676 B2 | 8/2004 | Wallace et al. | |

(Continued)

FOREIGN PATENT DOCUMENTS

JP 2004161087 A 6/2004

(Continued)

OTHER PUBLICATIONS

Ruth Ilan, Non-Final Office Action, Notification Date of Apr. 5, 2011, U.S. Appl. No. 12/247,376, Titled: Image Based Occupant Classification Systems for Determining Occupant Classification and Seat Belt Status and Vehicles Having Same, Filed: Oct. 8, 2008, Inventor: Brian T. Allen, 7 pages.

(Continued)

*Primary Examiner* — Darnell Jayne
*Assistant Examiner* — Sasha T Varghese
(74) *Attorney, Agent, or Firm* — Ulmer & Berne LLP

(57) ABSTRACT

A method for testing an image based occupant classification system includes identifying a plurality of disturbances for an image based occupant classification system and identifying a plurality of test occupants for a vehicle. The method further includes randomly selecting at least one disturbance from the plurality of disturbances and randomly selecting a test occupant from the plurality of test occupants.

14 Claims, 6 Drawing Sheets

U.S. PATENT DOCUMENTS

| | | | |
|---|---|---|---|
| 6,789,408 B2 * | 9/2004 | Schweizer et al. | 73/12.01 |
| 6,915,228 B2 * | 7/2005 | Uffenkamp et al. | 702/94 |
| 6,961,443 B2 | 11/2005 | Mahbub | |
| 6,985,077 B2 | 1/2006 | Nathan et al. | |
| 7,039,513 B2 | 5/2006 | Hermann et al. | |
| 7,095,002 B2 | 8/2006 | Kong et al. | |
| 7,110,571 B2 | 9/2006 | Occhipinti | |
| 7,315,973 B1 * | 1/2008 | Wise | 714/741 |
| 2003/0036892 A1 * | 2/2003 | Burge et al. | 703/8 |
| 2003/0093200 A1 * | 5/2003 | Gutta et al. | 701/45 |
| 2003/0204384 A1 * | 10/2003 | Owechko et al. | 703/1 |
| 2004/0001615 A1 * | 1/2004 | Philomin et al. | 382/118 |
| 2004/0133325 A1 * | 7/2004 | Neal et al. | 701/46 |
| 2005/0056104 A1 * | 3/2005 | David et al. | 73/865.3 |
| 2005/0090957 A1 * | 4/2005 | Luo et al. | 701/45 |
| 2005/0111700 A1 | 5/2005 | O'Boyle et al. | |
| 2005/0263992 A1 | 12/2005 | Matsida | |
| 2006/0049929 A1 | 3/2006 | Lawrence et al. | |
| 2006/0092401 A1 | 5/2006 | Troxell et al. | |
| 2006/0276945 A1 * | 12/2006 | Kong et al. | 701/45 |
| 2007/0055428 A1 | 3/2007 | Kong et al. | |
| 2007/0085669 A1 | 4/2007 | Becker et al. | |
| 2007/0194900 A1 | 8/2007 | Hawkins et al. | |
| 2007/0195990 A1 | 8/2007 | Levy | |
| 2007/0206836 A1 | 9/2007 | Yoon et al. | |
| 2007/0222572 A1 | 9/2007 | Downey et al. | |
| 2008/0094195 A1 | 4/2008 | Odate et al. | |
| 2008/0164682 A1 | 7/2008 | Matsuda | |
| 2009/0034794 A1 | 2/2009 | Ishikawa | |
| 2010/0086178 A1 * | 4/2010 | Allen | 382/104 |
| 2010/0087990 A1 * | 4/2010 | Allen | 701/45 |

FOREIGN PATENT DOCUMENTS

| | | |
|---|---|---|
| JP | 2007055294 A | 3/2007 |

OTHER PUBLICATIONS

Ilan, Ruth, Notice of Allowance and Fee(s) Due; Notification Date of Jul. 28, 2011; U.S. Appl. No. 12/247,376; Titled: Methods for Testing an Image Based Occupant Classification System; Filed: Oct. 8, 2008; 5 pages; Inventor: Brian T. Allen.

U.S. Appl. No. 12/247,343, Titled: Illumination Source for an Image Based Occupant Classification System and Vehicle Using Same, Filed: Oct. 8, 2008; Inventor: Brian T. Allen, in its entirety.

U.S. Appl. No. 12/247,376, Titled: Image Based Occupant Classification Systems for Determining Occupant Classification and Seat Belt Status and Vehicles Having Same, Filed: Oct. 8, 2008: Inventor: Brian T. Allen, in its entirety.

Non-Final Office Action dated Sep. 9, 2011, U.S. Appl. No. 12/247,343, filed Oct. 8, 2008, Inventor: Brian T. Allen, 23 pages.

Notice of Allowance dated Jan. 5, 2012, U.S. Appl. No. 12/247,343, filed Oct. 8, 2008, Inventor: Brian T. Allen, 31 pages.

* cited by examiner

| | |
|---|---|
| 1 | Empty Seat, Seat Track-Full Forward, Incline-Full Forward, Headrest-Removed |
| 2 | Empty Seat, Seat Track-Full Forward, Incline-Full Forward, Headrest-Fully Up |
| 3 | Empty Seat, Seat Track-Mid Incline-MID, Headrest-Removed |
| 4 | Empty Seat, Seat Track-Full Rearward, Incline-Full Forward, Headrest-Removed |
| 5 | Empty Seat, Seat Track-Full Rearward, Incline-Full Reclined, Headrest-Fully Down |
| 6 | Empty Seat, Seat Track-Full Forward, Incline-MID, Headrest-Fully Down |
| 7 | Empty Seat, Seat Track-Full Forward, Seat Track-Full Forward, Incline-MID, Headrest-Fully Up |
| 8 | A grocery bag on Empty Seat, Track-FF, Incline-MID, Cushion-MID |
| 9 | A 10" ball on Empty Seat,Track-FF, Incline-MID, Cushion-MID |
| 10 | Cosco Arriva 02727 with base,N,Y,FR,F,In-Use,U,2 |
| 11 | Cosco Arriva 02727,Y,N,FR,R,Stowed,D,1 |
| 12 | Cosco Arriva 02727,N,N,FF,R,In-Use,U,1 |
| 13 | Cosco Arriva 02727 with base,N,Y,FF,R,In-Use,D,0 |
| 14 | Cosco Arriva 02727,N,N,MID,F,In-Use,D,1 |
| 15 | Cosco Arriva 02727 with base,Y,Y,FF,R,In-Use,U,2 |
| 16 | Cosco Arriva 02727,Y,N,FF,R,Stowed,U,2 |
| 17 | Cosco Arriva 02727 with base,N,Y,FF,F,Stowed,D,2 |
| 18 | Cosco Touriva 02518,N,MID,F,0 |
| 19 | Cosco Touriva 02519,N,FF,F,0 |
| 20 | Cosco Touriva 02519,Y,FF,R,0 |
| 21 | Cosco Touriva 02519,N,FR,F,0 |
| 22 | Cosco Touriva 02519,N,FR,R,0 |
| 23 | Cosco Touriva 02519,Y,MID,F,0 |
| 24 | Cosco Touriva 02519,N,MID,R,0 |
| 25 | Cosco Touriva 02519,N,FF,R,0 |
| 26 | Three year old child Convertibles, belted,rearward facing, Cosco Touriva 02519,FR |
| 27 | Three year old child Convertibles, belted,forward facing, Cosco Touriva 02519,FF |
| 28 | Three year old child Convertibles, belted,rearward facing, Cosco Touriva 02519,FF |
| 29 | Three year old child Convertibles, unbelted,rearward facing, Cosco Touriva 02519,MID |
| 30 | Three year old child Convertibles, belted,rearward facing, Cosco Touriva 02519,MID |
| 31 | Three year old child Convertibles, unbelted,rearward facing, Cosco Touriva 02519,FR |
| 32 | Three year old child Convertibles, unbeltedforward facing, Cosco Touriva 02519,FF |
| 33 | Three year old child Convertibles, unbelted,forward facing, Cosco Touriva 02519,FR |
| 34 | Three year old child Sitting, not belted, Stand on seat,facing forward,MID |
| 35 | Three year old child Sitting, not belted, Stand on seat,facing forward,FR |
| 36 | Three year old child Sitting, not belted, Sitting on seat with back against reclined seat back,FF |
| 37 | Three year old child Sitting, not belted, Kneel on seat facing rearward,MID |
| 38 | Three year old child Sitting, not belted, Sitting on seat with back against reclined seat back,MID |
| 39 | Three year old child Sitting, not belted, Sitting on seat with back against reclined seat back,FR |
| 40 | Three year old child Sitting, not belted, Kneel on seat facing forward,FR |
| 41 | Three year old child Sitting, not belted, Kneel on seat facing rearward,FR |
| 42 | Six year old child Booster, Belted, Britax Roadster 3004,FF,0 |
| 43 | Six year old child Booster, Belted, Britax Roadster 3004,FR,0 |
| 44 | Six year old child Sitting Position, Not belted,Sitting back in the seat and leaning on the front outboard passenger door,MID |
| 45 | Six year old child Sitting Position, Not belted,Sitting on seat edge,spine vertical,hands by the dummy's side,FR |

METHODS FOR TESTING AN IMAGE BASED OCCUPANT CLASSIFICATION SYSTEM

TECHNICAL FIELD

An image based occupant classification system ("IBOCS") can monitor vehicular characteristics to determine characteristics of an occupant. Algorithm(s) associated with the image based occupant classification system can be tested to ensure that characteristics of an occupant are properly determined.

BACKGROUND

An IBOCS can control safety devices on a vehicle according to monitored vehicular conditions. In particular, an IBOCS can monitor an occupant of a vehicle. During normal operation of the vehicle, actuation of safety devices can be suppressed according to certain characteristics of the occupant (e.g., size, shape, position, and/or movement of the occupant). At least one algorithm associated with the IBOCS can be configured to analyze occupant information gathered by the IBOCS to determine the characteristic(s) of the occupant. The algorithm can be tested to ensure proper determination of the occupant characteristics. Conventionally, the algorithm testing can be conducted using simulation and/or modeling in a computer-based environment and, as a result, a multitude of testing conditions can be provided under which to test the algorithm. The multitude of testing conditions, however, is often too voluminous to allow for complete testing of the algorithm in a real-world environment.

SUMMARY

According to one embodiment, a method for testing an image based occupant classification system comprises identifying a plurality of disturbances for an image based occupant classification system and identifying a plurality of test occupants for a vehicle. The method can further comprise randomly selecting at least one disturbance from the plurality of disturbances and randomly selecting a test occupant from the plurality of test occupants. The method can still further comprise introducing said randomly selected disturbance and randomly selected test occupant to the image based occupant classification system and evaluating whether the image based occupant classification system properly determines a characteristic of the test occupant.

According to yet another embodiment, ti method for testing an image based occupant classification system comprises identifying a plurality of disturbances for the image based occupant classification system and identifying a plurality of test occupants for a vehicle. The method further comprises employing a randomizer to randomly select from among the plurality of disturbances, to randomly select from among the plurality of test occupants, and to associate each of the randomly selected disturbances with at least one of the randomly selected test occupants.

According to still another embodiment, a method for testing an image based occupant classification system comprises generating a plurality of test cases. Each test case comprises a randomly selected disturbance and a randomly selected test occupant. For each test case, the method further comprises introducing the randomly selected test occupants into a passenger compartment of a vehicle and performing the disturbance. The method still further comprises calculating a failure rate of an algorithm associated with the image based occupant classification system in determining a characteristic of the test occupant.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 6 illustrates a portion of a test list in accordance with one embodiment.

DETAILED DESCRIPTION

Figure 1:
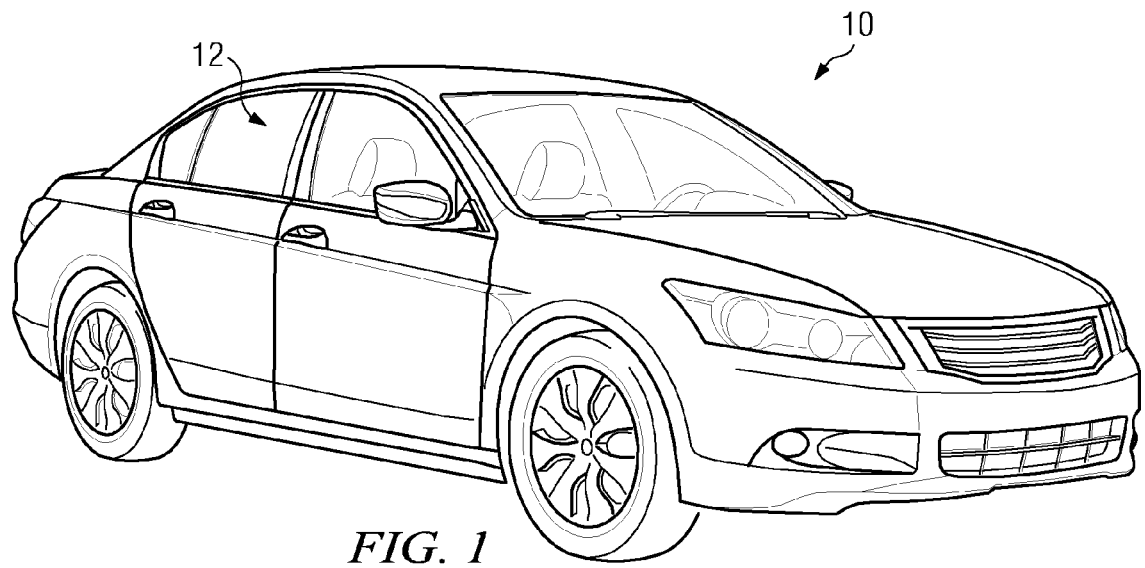
FIG. 1 is a perspective view depicting a vehicle in accordance with one embodiment.

The present invention and its operation are hereinafter described in detail in connection with the views and examples of FIGS. 1-7, wherein like numbers indicate the same or corresponding elements throughout the views. An IBOCS in accordance with one embodiment can be provided on a vehicle 10 which is shown in FIG. 1 to comprise an automobile. However, an IBOCS can alternatively be provided upon any of a variety of alternative vehicles, such as, for example, a truck, a van, a recreational vehicle, a utility vehicle, an aircraft, agricultural equipment, or construction equipment. Though the vehicle 10 is shown to be of a type which includes a passenger compartment 12 which is accessible through four respective passenger doors, it will be appreciated that vehicles in accordance with other embodiments can include any of a variety of other suitable passenger compartments (e.g., provided within a two-door sedan, pickup truck, or convertible).

Figure 2:
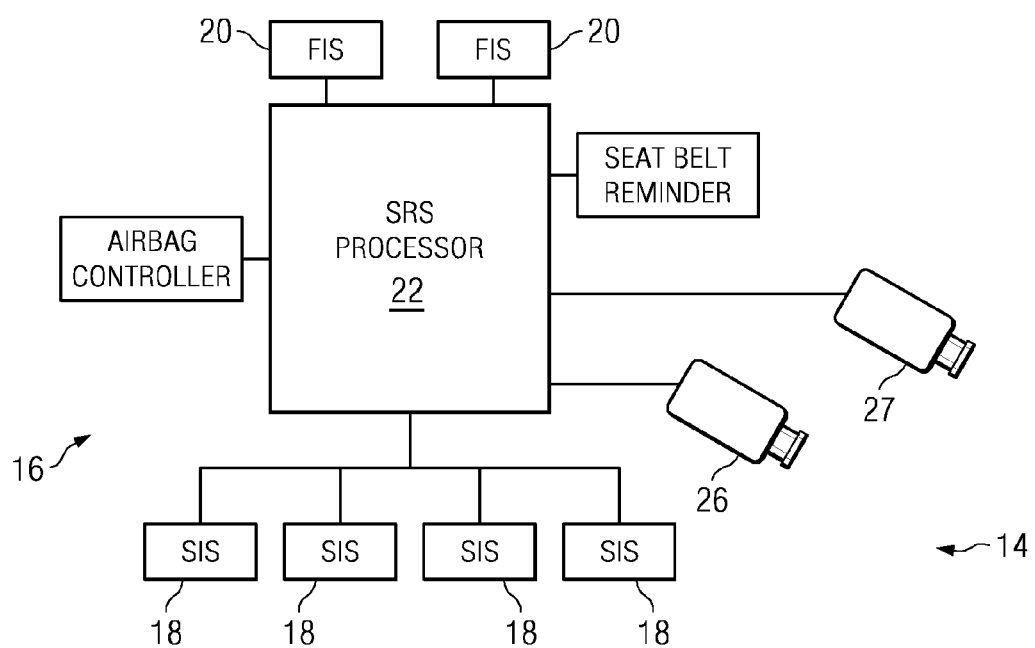
FIG. 2 is a schematic view depicting an IBOCS of the vehicle of FIG. 1.

As illustrated in FIG. 2, an IBOCS 14 can include a supplemental restraint system ("SRS") 16. The SRS 16 can include various safety devices (e.g., scat belt retractors, airbags, crash avoidance systems) that can be actuated during a collision. The SRS 16 can be configured to monitor vehicular collision conditions. The SRS 16 is shown in FIG. 2 to include side impact sensors 18 and front impact sensors 20. In one embodiment, the side impact sensors 18 and front impact sensors 20 can include accelerometers. In such an embodiment, the accelerometers can be disposed along the vehicle to monitor the acceleration encountered during a collision. For example, the side impact sensors 18 can be disposed along a side of the vehicle 10 (e.g., within one or more side pillars) such that a collision along a side of the vehicle 10 can be monitored. Additionally, the front impact sensors 20 can be disposed along a front of the vehicle 10 (e.g., within a front bumper) such that a collision along a front of the vehicle 10 can be monitored. In other embodiments, impact sensors can include an image sensor, a radar unit, or a LIDAR unit. It will be appreciated that an SRS can include any of a variety of additional or alternative arrangements for monitoring vehicular collision conditions. For example, the SRS 16 can include $G_x$ and $G_y$ sensors to monitor vehicular acceleration. It will also be appreciated that, in addition or alternative to monitoring collision conditions that are native to the vehicle, the SRS 16 can monitor any of a variety of collision conditions external to the vehicle 10. For example, the SRS 16 can include an external sensor, such as a radar headway sensor, to monitor approaching objects, such as vehicles or pedestrians.

The SRS 16 can analyze the collision conditions to determine whether the vehicle 10 is experiencing a collision. If the SRS 16 determines that a collision is occurring, the safety devices can be actuated. In one embodiment, as illustrated in FIG. 2, an SRS processor 22 can determine whether the vehicle 10 is experiencing a collision and can, in response to the determination of a collision, facilitate actuation of one or more airbags within the vehicle (e.g., 17 in FIG. 3). For example, the side and front impact sensors 18, 20 can be in communication with the SRS processor 22 such that the collision conditions can be transmitted to the SRS processor 22. In one embodiment, the side and front impact sensors 18, 20 can transmit collision conditions to the SRS processor 22 via communication cable (e.g., wire or fiber optic in a drive-by-wire configuration). In another embodiment, the side and front impact sensors 18, 20 can transmit collision conditions to the SRS processor 22 wirelessly. The SRS processor 22 can analyze the transmitted collision conditions to determine whether a collision is occurring and can actuate an airbag (e.g., 17) accordingly. It will be appreciated that the SRS processor 22 can include any of a variety of suitable SRS controllers and/or processors to facilitate receipt and analysis of the collision conditions. It will also be appreciated, however, that the SRS processor 22 can provide additional or alternative functionality to the SRS 16. For example, in lieu of, or in addition to, side and/or front impact sensors 18, 20 mounted along the vehicle, as described above, the SRS processor 22 can include side impact sensors (e.g., $G_x$ sensors), a front impact sensor (e.g., a $G_y$ sensor), and/or any of a variety of other collision sensors.

Actuation of the safety devices can be controlled by the IBOCS 14 to ensure proper deployment when the vehicle 10 is involved in a collision. In one embodiment, actuation of the safety devices can be suppressed to ensure that the safety devices do not actuate during a collision. For example, deployment of an airbag can be suppressed when a child or child seat occupies a passenger seat. In another example, deployment of an airbag can be suppressed when a passenger seat is unoccupied. In another embodiment, when the safety devices are actuated (e.g., during a collision), the manner in which the safety devices are actuated can be regulated to ensure that proper protection is provided for a passenger. For example, deployment of an airbag can be slowed if a passenger is positioned too close to a dashboard. In another example, a left portion of an airbag can be more fully deployed for an occupant that is moving increasingly leftward during a collision.

In one embodiment, the safety devices, such as airbags, can be selectively suppressed during startup of the vehicle 10. For example, when the vehicle 10 is started, an occupant can be identified as an adult, child, or child seat. Based upon that identification, deployment of airbags can be placed in a suppressed state (e.g., for a child or child seat) or permissive state (e.g., for an adult). The state of the airbags can be maintained until a different occupant is identified. In this configuration, with deployment of airbags in a permissive state, upon collision of the vehicle 10, the airbags can immediately deploy. In another embodiment, the airbags can be selectively suppressed during a collision of the vehicle 10. For example, when the vehicle 10 initially enters into a collision, an occupant can at that time be identified as an adult, child, or child seat. Based upon that identification, an airbag can be suppressed (e.g., for a child or child seat) or permitted to deploy (e.g., for an adult). In yet another embodiment, when the vehicle 10 initially enters into a collision, the movement of an occupant during the collision can be monitored and deployment of an airbag or other safety device can be tailored to best cushion the occupant's movement.

To facilitate control of the various safety devices, the IBOCS 14 can monitor vehicular conditions. In one embodiment, the IBOCS 14 can monitor characteristics of an occupant disposed within the passenger compartment 12. For example, the IBOCS 14 can monitor the size, height and shape of an occupant to determine whether the occupant is an adult, a child, or a child seat (e.g., the occupant's classification). In another example, the IBOCS 14 can monitor an occupant's movement to determine the position of the occupant. In still another example, an IBOCS 14 can monitor the position of a seatbelt. In yet another example, the IBOCS 14 can monitor the presence or absence of an occupant within the passenger compartment 12. However, it will be appreciated that any of a variety of other vehicular conditions can be monitored by the IBOCS 14 to facilitate control by the IBOCS 14 of the various safety devices. For example, the IBOCS 14 can monitor a passenger seat to determine whether the seat is occupied by a passenger or other object. In another example, the IBOCS 14 can monitor an airbag to ensure it has deployed properly (e.g., to assess whether a backup airbag should be deployed). In yet another example, the IBOCS 14 can monitor interior components of the vehicle 10 to assess whether structural deformation has occurred, and/or whether a seat belt should be retracted. Although the vehicular conditions have been described with respect to conditions occurring within the vehicular compartment 12 (i.e., in-cabin conditions), it will be appreciated that vehicular conditions can also include conditions that occur external to the passenger compartment.

Figure 3:
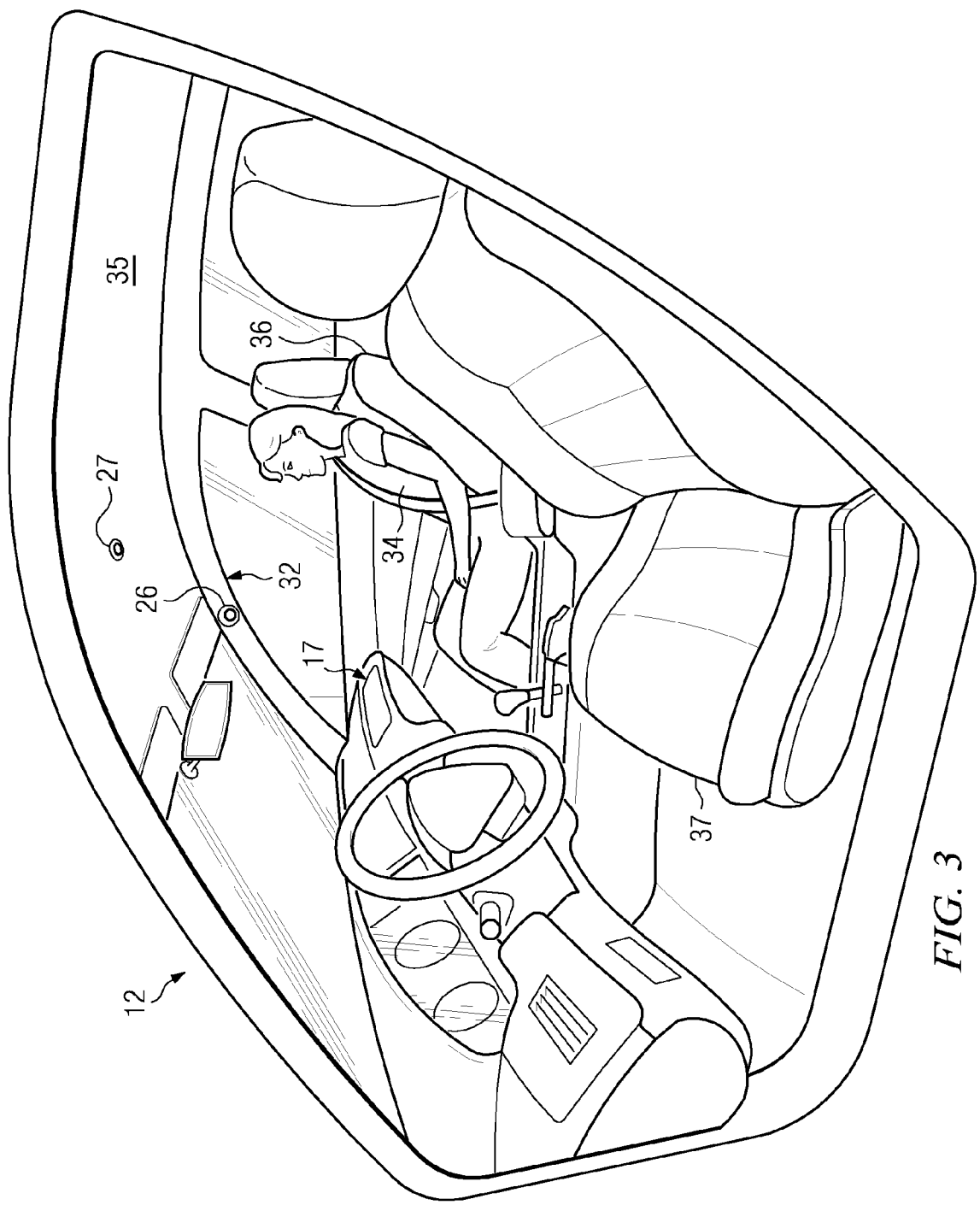
FIG. 3 is an enlarged perspective view depicting a portion of a passenger compartment of the vehicle of FIG. 1, wherein image sensors in accordance with one embodiment are provided.

In one embodiment, with reference to FIG. 3, in order to facilitate the foregoing features, the IBOCS 14 can include an image sensor 26 that is configured to monitor vehicular conditions. The image sensor 26 can be configured for capturing images and can, for example, comprise a near-infrared charge-coupled-device (CCD), a CMOS sensor, or a thermographic camera. As illustrated in FIG. 3, the image sensor 26 can be disposed along a pillar 32 of the vehicle 10 such that vehicular occupant information can be captured for an occupant 34 seated in a passenger seat 36. However, it will be appreciated that additional or alternative image sensors can be provided in any of a variety of other suitable locations and/or arrangements within or adjacent to the passenger compartment 12 of the vehicle 10. For example, as shown in FIG. 3, an image sensor 27 can be attached to the ceiling 35. In such an embodiment, the image sensors 26, 27 can be separated by a known distance such that a 3-dimensional image can be produced. In yet another example, an image sensor can be provided adjacent to a driver's seat 37 to capture vehicular occupant information for a driver (not shown) and can, for example, be attached to a dashboard, center console, door panel, or any of a variety of other suitable features within the passenger compartment of a vehicle. In yet another example, an image sensor can be provided adjacent to rear seats of a vehicle to capture vehicular occupant information for passengers seated in, these rear seats. It will be appreciated that a vehicle can include image sensors provided in any or all of these locations. It will also be appreciated that the IBOCS can additionally or alternatively include illumination sources provided in any or all of these locations.

The image sensor 26 can be selectively actuated to capture images of the vehicular conditions. The frequency of the actuation (e.g., capture rate) can be varied according to the particular vehicular condition being captured. When a vehicular condition is not subject to frequent change, the capture rate of the image sensor 26 may be less frequent (e.g., one actuation every three seconds). However, when a vehicular condition is subject to frequent change, the capture rate of the image sensor 26 may increase. For example when determining whether a seated occupant is a child or an adult, since it is unlikely that the status of the occupant will change frequently, the capture rate of the image sensor 26 can be less frequent. However, when assessing an occupant's movement, since the movement of the occupant can change frequently, the capture rate of the image sensor 26 can be more frequent (e.g., every 50 milliseconds) to facilitate effective discernment of the movement. In one embodiment as described above, movement of an occupant can be monitored during a collision. Therefore, it will be appreciated that the capture rate of the image sensor 26 can selectively increase in response to detection by the SRS processor 22 of a collision.

The image sensor 26 is shown in FIG. 2 to be in direct communication with the SRS processor 22. In one embodiment, the image sensor 26 can be in communication with the SRS processor 22 via a communication cable (e.g., wire or fiber optic in a drive-by-wire configuration). In another embodiment, the image sensor 26 can be in wireless communication with the SRS processor 22. It will be appreciated that in an alternative embodiment, an image sensor and an SRS processor can communicate indirectly such as by way of one or more other components.

In one embodiment, the SRS processor 22 and the image sensor 26 can communicate with each other (e.g., bidirectional communication) to facilitate vehicular condition monitoring. In particular, the SRS processor 22 can control the actuation and/or capture rate of the image sensor 26 to monitor certain vehicular conditions. The captured vehicular conditions can be transmitted from the image sensor 26 to the SRS processor 22. The SRS processor 22 can then analyze the images to determine an occupant's classification, movement, and/or other characteristic. In another embodiment, the image sensor 26 can communicate with the SRS processor 22 (e.g., unidirectional communication) to facilitate vehicular condition monitoring. In particular, in this embodiment the image sensor 26 can control its own actuation and/or capture rate. The captured vehicular conditions can be transmitted from the image sensor 26 to the SRS processor 22. The SRS processor 22 can then analyze the images to determine an occupant's classification, movement, and/or other characteristic.

It will be appreciated that the IBOCS 14 can employ an algorithm or other suitable alternative data structure in order to determine occupant characteristics from the monitored vehicular conditions. For example, the IBOCS 14 can include an occupant classification algorithm that is configured to analyze the vehicular occupant information captured by the image sensor and determine whether an occupant is a child, adult, child seat, or whether a seat is unoccupied. In another example, the IBOCS 14 can additionally or alternatively include an occupant positioning algorithm that is configured to analyze the vehicular occupant information captured by the image sensor and determine the movement of the occupant. It will be appreciated that any of a variety of suitable alternative algorithms can additionally or alternatively be employed to determine other occupant characteristics.

It will be appreciated that, during operation of the vehicle 10, various disturbances, such as malfunction events, driving conditions, and/or lighting conditions, may affect the ability of the IBOCS 14 to effectively determine occupant characteristics (e.g., occupant classification, occupant positioning/movement). The algorithm, therefore, can be optimized to reduce the number of instances in which an occupant's characteristics are invalidly determined as a result of the disturbances. In one embodiment, the algorithm can employ image filtering in order to reduce the frequency of invalid determinations. When initially configuring an algorithm (e.g., when designing or testing a concept vehicle), it will be appreciated that the algorithm can be tested to ensure that the failure rate of the algorithm is acceptable.

To facilitate testing of such an algorithm, a variety of disturbances can be identified and considered. It will be appreciated that the disturbances can represent real-world conditions that may affect the ability of the IBOCS 14 to correctly determine occupant characteristics. In one embodiment, a variety of malfunction events can be identified that may affect determination of occupant classification by an IBOCS. It will be appreciated that the malfunction events can include any event within the passenger compartment or associated with the passenger compartment which can impair the ability of the IBOCS 14 to properly determine occupant characteristics. In one embodiment, for example, the malfunction events can include problematic events such as an out of position occupant (e.g., leaning against a pillar, leaning towards the windshield, standing up), an object blocking the image sensor (e.g., a balloon, newspaper), vibration in the passenger compartment, lighting problems (e.g., too bright, too strong, shadows, turbulent light), and/or an abnormal occupant (e.g., box on seat, occupant holding newspaper). In another embodiment, the malfunction events can additionally or alternatively include seat conditions such as seat position (e.g., fully forward, middle, fully back), backrest position (e.g., upright, midway reclined, fully reclined), and headrest position (e.g., removed, fully down, fully up).

Figure 4:
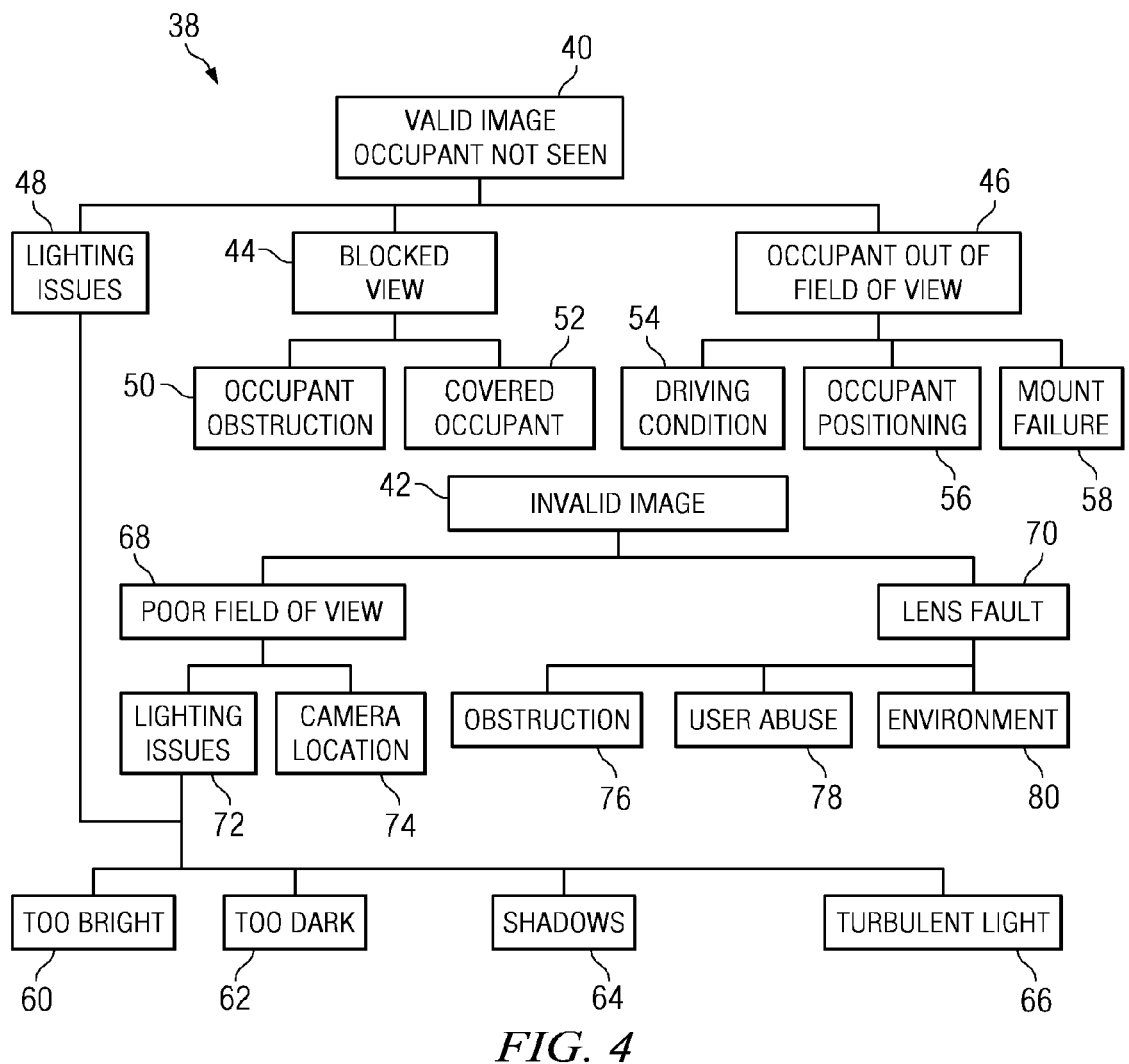
FIG. 4 is a block diagram depicting a fault tree in accordance with one embodiment.

In one embodiment, to facilitate identification of some of the problematic events, a fault tree 38, as illustrated in FIG. 4, can be provided. To construct the fault tree 38, undesired events can be identified and provided at the head of the fault tree 38. These undesired events are shown in blocks 40, 42 to include "valid image—occupant not seen" and "invalid image" but can include any of a variety of events that can cause an invalid occupant classification. Once the undesired events are identified, various physical conditions can be identified and provided beneath the undesired events in a hierarchical form. For example, as illustrated in FIG. 4, the physical conditions 44, 46, 48 shown linked immediately below the undesired event 40 are each conditions that can cause an occupant to remain unseen even though a valid image is obtained and can include a blocked view, an occupant out of field of view, and lighting issues. A blocked view can be caused by an occupant obstruction and/or a covered occupant as shown in blocks 50, 52. An occupant can be out of field view due to driving conditions, occupant positioning, and/or mount failure as shown in blocks 54, 56, 58. Lighting issues can be caused by lighting being too bright, lighting being too dark, shadows, and/or turbulent light as shown in blocks 60, 62, 64, 66. As illustrated in FIG. 4, the physical conditions 68, 70 shown linked immediately below the undesired event "invalid image" 42 are each conditions that can cause an invalid image to be captured and can include a poor field of view and a lens fault. A poor field of view can be caused by lighting issues and/or camera location as shown in blocks 72, 74. The lighting issues that can cause a poor field of view can be the same lighting issues that cause an occupant to not be seen, as described above. A lens fault can be caused by an obstruction, user abuse, and/or environment as shown in blocks 76, 78, 80.

It will be appreciated that once the fault tree 38 has been constructed, malfunction events can be identified for each physical condition represented at the bottom of the fault tree 38 (e.g., the physical conditions that do not have other conditions linked below, namely 50, 52, 54, 56, 58, 60, 62, 64, 66, 74, 76, 78, and 80). These malfunction events can include any event which can bring about the identified physical condition. Malfunction events that can cause an occupant to be obstructed (e.g., block 50) can be identified and can include, for example, an occupant holding a newspaper, an occupant covering the image sensor, and/or an occupant holding a balloon. Malfunction events that can cause an occupant to be covered (e.g., block 52) can be identified and can include, for example, an occupant covered by a blanket. Malfunction events that can cause a driving condition that results in an occupant being out of a field of view (e.g., block 54) can be identified and can include, for example, a sudden sharp turn and/or sudden braking. Malfunction events that can cause an image sensor mount failure (e.g., block 58) can be identified and can include, for example, improper installation or abuse of the image sensor by an occupant. Malfunction events that can cause lighting to be too bright (e.g., block 60) can be identified and can include, for example, incorrect settings for supplemental lighting, increased sunlight, or headlights from an oncoming vehicle. Malfunction events that can cause lighting to be too dark (e.g., block 62) can be identified and can include, for example, incorrect settings for supplemental lighting, supplemental lighting malfunction, and/or nightfall. Malfunction events that can cause shadows (e.g., block 64) can be identified and can include, for example, excessive sunlight, excessive moonlight, and/or incorrect settings for supplemental lighting. Malfunction events that can cause turbulent lighting (e.g., block 66) can be identified and can include, for example, excessive sunlight, excessive moonlight, incorrect settings for supplemental lighting, supplemental lighting malfunction, and/or police lights. Malfunction events that can cause an image sensor location that results in a poor field of view (e.g., block 72, 74) can be identified and can include, for example, an image sensor directed away from occupant. Malfunction events that can cause an obstruction (e.g., block 76) can be identified and can include, for example, an occupant holding a newspaper, an occupant covering the image sensor, an occupant holding a balloon, and/or an occupant covered by a blanket. Malfunction events that can cause user abuse (e.g., block 78) can be identified and can include, for example, an occupant hitting the image sensor. Malfunction events that can cause an environmental issue (e.g., block 80) can be identified and can include, for example, an occupant smoking. It will be appreciated that malfunction events can be identified for any of a variety of physical conditions in any of a variety of manners (e.g., brainstorming).

In one embodiment, the IBOCS 14 can identify, and thus distinguish from among a variety of driving conditions that may affect the ability of the IBOCS 14 to validly determine occupant characteristics. For example, the driving conditions can include sudden braking (e.g., from 145 km/hr), travel along a gravel road, high speed driving, mid speed driving, low speed driving, normal speed driving, circular vehicular turns (e.g., 30 meter radius), travel along a river bed, travel along a rough road, travel along a moderately rough road, travel along a smooth road, traversing a hill, travel along a washboard, and travel along a winding road. It will be appreciated that the driving conditions can be any of a variety of vehicular operating conditions. It will also be appreciated that the driving conditions can be identified from predefined testing parameters, industry standards, by implementation of a fault tree, or in any of a variety of other suitable manners.

In one embodiment, a variety of lighting conditions can be identified that may affect the ability of the IBOCS 14 to validly determine occupant characteristics. The lighting conditions can include, for example, sunrise with minimal cloud cover, sunrise with partial cloud cover, sunrise with full cloud cover, noon sun with minimal cloud cover, noon sun with partial cloud cover, noon sun with full cloud cover, sunset with minimal cloud cover, sunset with partial cloud cover, sunset with full cloud cover, low angle sun, high angle sun, snow on ground, nighttime, minimal rain, moderate rain, heavy rain, thunderstorm, tunnel, and/or underground parking. It will be appreciated that the lighting conditions can be any of a variety of natural or artificial lighting conditions and can be identified from predefined testing parameters, industry standards, by implementing a fault tree, or in any of a variety of other suitable manners.

It will be appreciated that, in addition to the identification of the variety of disturbances, the IBOCS 14 can identify, and thus distinguish from among a variety of possible test occupants. These test occupants can represent common occupants or objects that may be seated in a vehicle. The test occupants can, for example, include an empty seat, an object on seat, a newborn car bed, a twelve-month-old secured within a rear-facing child restraint, a twelve-month-old secured within a convertible car seat, a three-year-old secured within a convertible car seat, a three-year-old secured within a booster seat, a three-year-old secured directly on a seat, a three-year-old in a due care position, a six-year-old secured on a booster seat, a six-year-old secured on a seat, a six-year-old in a due care position, an adult female-fifth percentile, an adult female-fiftieth percentile, an adult male-fiftieth percentile, and/or an adult male-ninety fifth percentile. It will be appreciated that the test occupants can be any of a variety of natural or artificial test occupants and can be identified from predefined testing parameters, industry standards, or in any of a variety of other suitable manners.

It will be appreciated that, to test the failure rate of an algorithm, the algorithm can be loaded into the IBOCS 14 (e.g., through programming), and different disturbances and different test occupants can be introduced to the IBOCS 14. The failure rate for the algorithm can be determined from the number of times that an occupant's characteristics are incorrectly determined as a result of the different disturbances. Assessing the response of the IBOCS 14 to every possible combination of the disturbances and test occupants can be cost prohibitive, and unnecessary. Therefore, in accordance with one embodiment, a plurality of test cases can be generated to provide a representative sample of a variety of different disturbances and test occupants. In particular, the test cases can be generated by randomly selecting a test occupant from the plurality of test occupants and randomly selecting at least one disturbance from the plurality of disturbances. As will be described in more detail below, the algorithm can be tested by assessing the response of the IBOCS 14 to these test cases.

It will be appreciated that the test cases can be generated from a particular group or groups of disturbances to tailor the testing of the algorithm. In particular, the response of the IBOCS 14 to the particular group(s) of disturbances can be assessed to test certain features of the algorithm. For example, the test cases can be generated from malfunction conditions to test the ability of the algorithm to effectively determine occupant characteristics in light of various malfunction conditions. In another example, the test cases can be generated from malfunction conditions and driving conditions to test the ability of the algorithm to effectively determine occupant characteristics in light of various malfunction conditions and driving conditions. In another example, the test cases can be generated from malfunction conditions, driving conditions, and lighting conditions to test the ability of the algorithm to effectively determine occupant characteristics in light of various malfunction conditions, driving conditions, and lighting conditions.

In one embodiment, a randomizer can be provided to generate test cases. The disturbances can be provided to the randomizer as datasets. The randomizer can randomly select disturbances from the datasets to generate each test case. For example, the randomizer can operate upon a dataset of test occupants, a dataset of malfunction events, and a dataset of driving conditions. The randomizer can comprise a random generator that is configured to randomly select a plurality of malfunction events from the first dataset, randomly select a plurality of test occupants from the second dataset, and randomly select a driving condition from the third dataset. To generate each test case, the random generator can associate a randomly selected malfunction event with randomly selected test occupant and a randomly selected driving condition.

It will be appreciated that the randomizer can be provided in any of a variety of arrangements to facilitate generation of test cases from the test occupants and disturbances. In one embodiment, the randomizer can be provided as a computer-based spreadsheet application, such as a Microsoft Office® Excel® spreadsheet. In such an embodiment, the plurality of test occupants, plurality of malfunction events, and plurality of driving conditions can be provided as respective lists within the spreadsheet. To generate each test case, a random generator (e.g., RAND( ) function) can select and associate a test occupant, a malfunction event, and a driving condition from each of the lists. The random generator can then populate a spreadsheet with each test case so generated, thus creating a test list as described above. It will be appreciated that the random generator can alternatively comprise any of a variety of other computer-based or non-computer-based applications that can receive a group of variables and output a randomized list.

Figure 5:
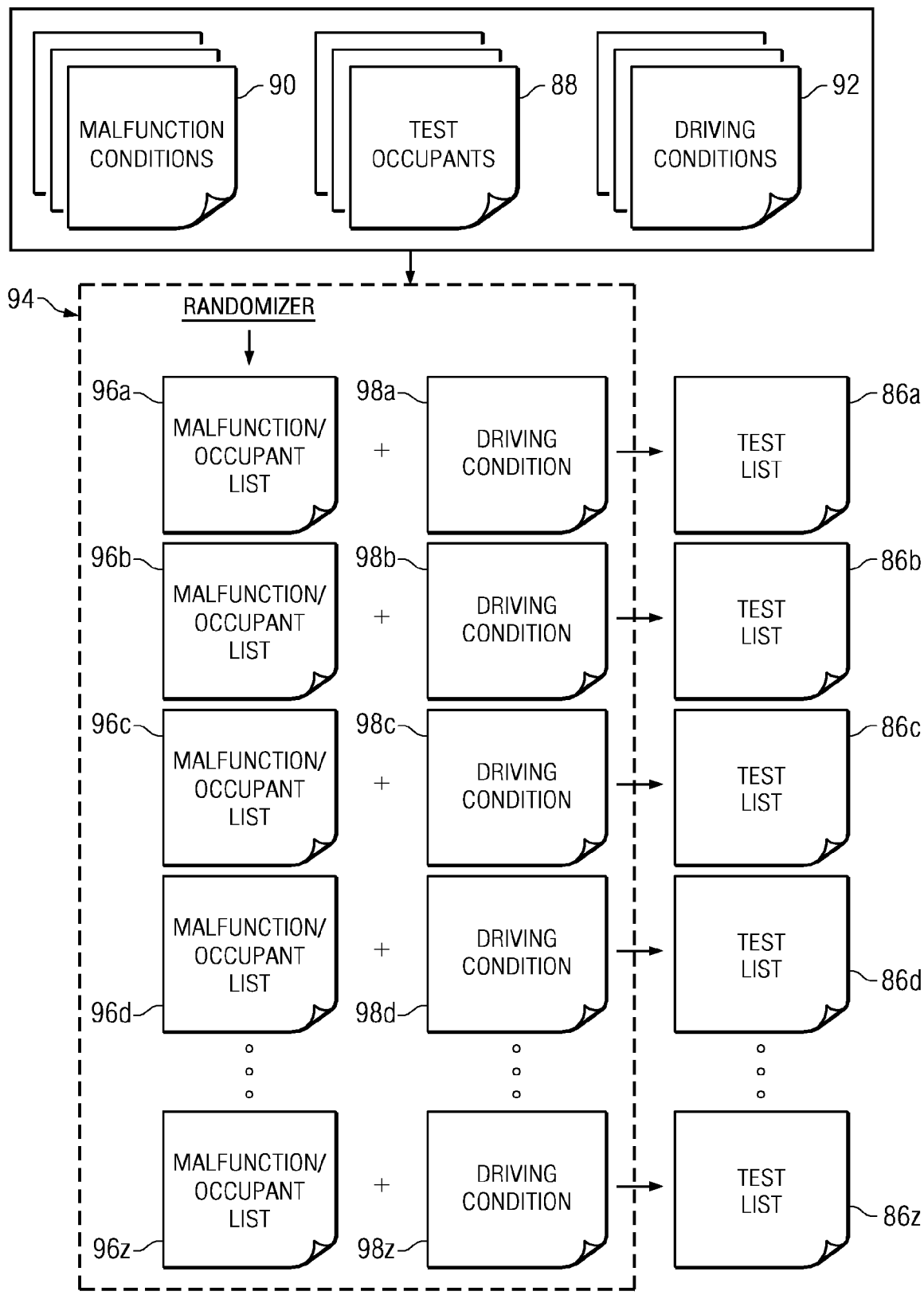
FIG. 5 is a block diagram depicting a method of generating test lists in accordance with one embodiment.

The test cases generated from the disturbances and the test occupants can be grouped into test lists. In particular, each test case grouped within a particular test list can share at least one common disturbance or test occupant. For example, as illustrated in FIG. 5, test cases can be generated and grouped into test lists (e.g., 86a, 86b, 86c, 86d, 86z) based upon a driving condition. In such an example, a plurality of test occupants 88, a plurality of malfunction events 90, and a plurality of driving conditions 92 can be provided into a randomizer 94. The randomizer 94 can generate a group of malfunction/occupant lists (e.g., 96a, 96b, 96c, 96d, 96z) from the plurality of test occupants 88 and the plurality of malfunction events 90. In particular, the randomizer 94 can populate each malfunction/occupant list (e.g., 96a, 96b, 96c, 96d, 96z) with a plurality of randomly selected test occupants. For each randomly selected test occupant, the randomizer 94 can randomly select a malfunction event from the plurality of malfunction events 90. The randomizer 94 can also generate randomly selected driving conditions (e.g., 98a, 98b, 98c, 98d, 98z) from the plurality of driving conditions 92. The randomizer 94 can then associate each malfunction/occupant list (e.g., 96a, 96b, 96c, 96d, 96z) with one of the randomly selected driving conditions to generate test lists (e.g., 86a, 86b, 86c, 86d, 86z). In one embodiment, as shown in FIG. 5, the test cases within each test list (e.g., 86a, 86b, 86c, 86d, 86z) can share a common driving condition. In other embodiments, however, each test case grouped within a particular test list might not share at least one common disturbance, driving condition, or test occupant.

An example of a malfunction/occupant list is illustrated in FIG. 6. Each line from the malfunction/occupant list can include a randomly selected test occupant associated with at least one randomly selected malfunction condition. As can be seen from the example of FIG. 6, each test occupant can be associated with a seat condition in order to populate a malfunction/occupant list. For example, randomly selected car seats models (e.g., Cosco Touriva, Cosco Arriva), randomly selected passengers (e.g., three-year-old, six-year-old) and other randomly selected occupants (e.g., grocery bag, ball) can be associated with randomly selected seat positions (e.g., Full Forward (FF), Full Rearward (FR), Mid Seat Track (MID)), backrest positions (e.g., Incline-MID, Include-Full Forward, Incline-Fully Back), and/or headrest positions (e.g., removed, fully up, fully down). It will be appreciated that, although the test cases in FIG. 6 illustrate test occupants associated with seat conditions, that any of a variety of suitable alternative malfunction events (e.g., problematic events) can additionally or alternatively be associated with each occupant.

Figure 7:
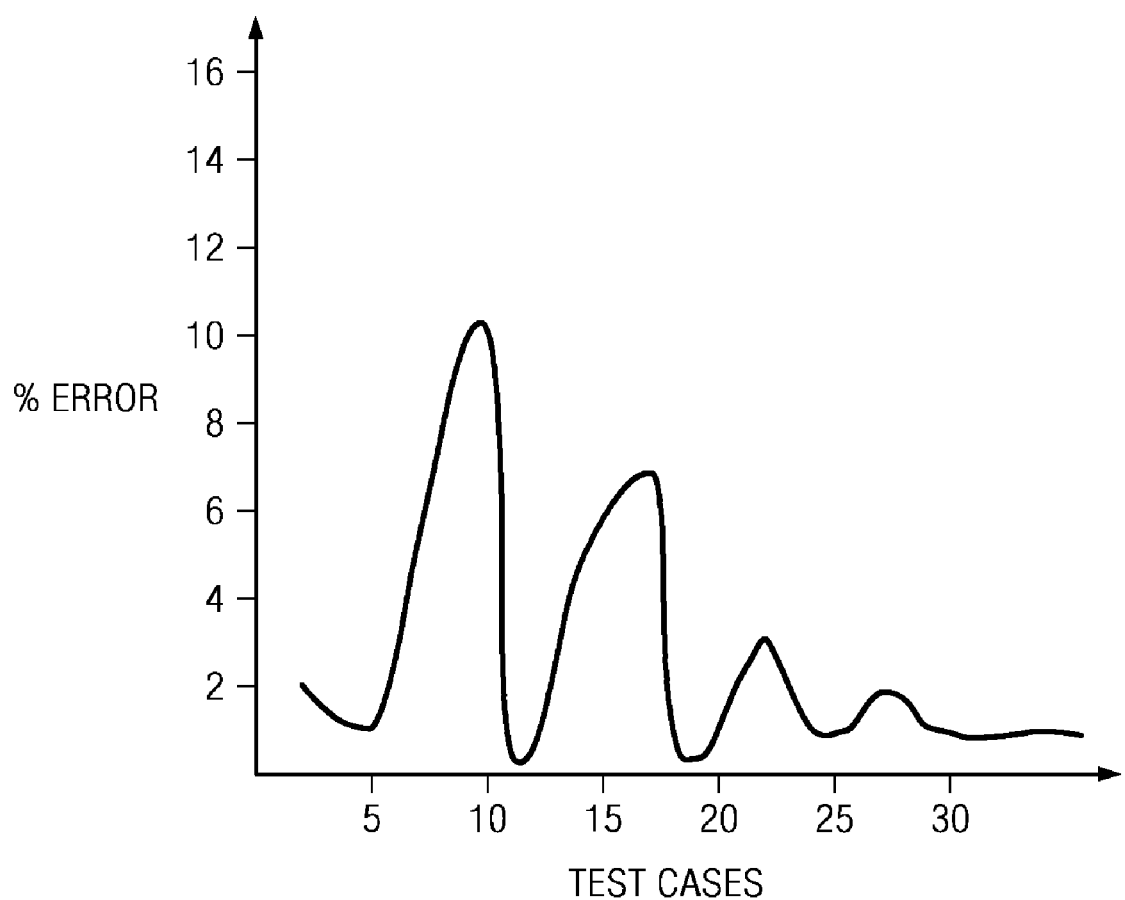
FIG. 7 is a plot depicting a failure rate for a plurality of test cases.

To determine the overall failure rate of the algorithm, the failure rate of the algorithm for each test case can be determined. In particular, the test occupant and disturbance(s) from a test case can be introduced to the IBOCS 14. The IBOCS 14 can monitor the test occupant to determine an occupant characteristic. The percentage of invalid determinations of the occupant characteristic can indicate the failure rate of the algorithm for the test case. By accumulating the failure rate of the algorithm for each test case, the overall failure rate of the algorithm can be determined. It will be appreciated that if the failure rate of the algorithm is below a predetermined level, the algorithm can be considered to be effective, and testing of the algorithm can be concluded. However, if the failure rate of the algorithm exceeds a predetermined level, the algorithm can be reconfigured and retested until the overall failure rate of the algorithm is maintained at or below the predetermined level. For example, as illustrated by FIG. 7, the failure rate of the algorithm for each test case can be plotted. When the failure rate of the algorithm normalizes within a particular range (as shown by the failure rates for test cases 20-30, testing can be concluded for the algorithm. It will be appreciated that the predetermined level for the maximum failure rate can be established according to any of a variety of factors including predetermined safety parameters for the IBOCS 14.

It will be appreciated that the test cases can facilitate extensive testing of an IBOCS. For example, using random selection of disturbances and test occupants can facilitate effective testing of an algorithm and without having to achieve every combination of test occupants and disturbances. Therefore, an algorithm can be effectively tested in less time and at a reduced cost. For example, when utilizing simulation and/or modeling to test an algorithm, the test cases can provide the conditions under which to perform the testing. As such, effective simulation and/or modeling can be achieved without the need to test the algorithm under every possible combination of test conditions.

While simulation and/or modeling can be used to test a random selection of test cases, as discussed above, or can alternatively be used to test enough test cases to achieve every combination of test occupants and disturbances, it will be appreciated that real-world testing of algorithms (i.e., testing the algorithm in a physical environment) can also be desired in certain circumstances. To conduct such real-world testing of every combination of test occupants and disturbances would be costly, laborious, and thus impractical. However, by providing a representative sample of the test cases and occupants in fewer than the total number of possible test cases (such as through the randomization process described above), effective real world testing of the IBOCS 14 can be achieved in an efficient manner. In one embodiment, a vehicle can be operated according to each test case. In particular, for each test case, a test occupant can be provided in the vehicular compartment (e.g., 12 as shown in FIG. 1) and the disturbance (s) can be performed. Using the algorithm(s), the IBOCS 14 can monitor the test occupant to determine an occupant characteristic. The percentage of invalid determinations of the occupant characteristic can indicate the failure rate of the algorithm(s) for the test case. It will be appreciated that real world testing of the algorithm(s) can improve the overall confidence in the results of the process of testing the algorithms. For example, by testing the algorithm(s) in a simulated/modeled environment as well as in a physical environment, the robustness of the algorithm testing can be improved.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A method for testing an image based occupant classification system comprising an image sensor, the method comprising:
  constructing a fault tree that includes:
    a plurality of first physical events that cause the image based occupant classification system to malfunction when the image sensor obtains a valid image; and
    a plurality of second physical events that cause the image sensor to obtain an invalid image;
  identifying a plurality of test occupants for a vehicle;
  randomly selecting at least one of the first physical events from the fault tree;
  randomly selecting at least one of the second physical events from the fault tree;
  randomly selecting a test occupant from the plurality of test occupants;
  physically introducing said randomly selected first physical event, said randomly selected second physical event, and said randomly selected test occupant to the image sensor at different times;
  operating the image sensor to facilitate determination of an occupant characteristic by the image based occupant classification system for each of said randomly selected first physical event, said randomly selected second physical event, and said randomly selected test occupant;
  determining whether the image based occupant classification system properly identified a characteristic of the test occupant for each of said randomly selected first physical event, said randomly selected second physical event, and said randomly selected test occupant;
  calculating a failure rate of the image based occupant classification system; and
  reconfiguring an algorithm of the image based occupant classification system when the failure rate is above a predetermined level.

2. The method of claim 1 further comprising identifying a driving condition and introducing the driving condition to the image based occupant classification system.

3. The method of claim 2 wherein introducing the driving condition comprises operating a vehicle according to the driving condition, wherein the vehicle includes the image based occupant classification system.

4. The method of claim 1 wherein constructing the fault tree further comprises compiling a list of the plurality of first physical events.

5. The method of claim 1 wherein constructing the fault tree further comprises compiling a list of the plurality of second physical events.

6. The method of claim 1 wherein identifying the plurality of test occupants comprises compiling a list of the plurality of test occupants.

7. The method of claim 1 wherein randomly selecting at least one of the first physical events randomly selecting at least one of the second physical events, and randomly selecting a test occupant comprises employment of a randomizer.

8. The method of claim 1 wherein the plurality of first physical events comprises:
  a plurality of lighting issues that cause the image based occupant classification system to malfunction when the image sensor obtains a valid image;
  a plurality of blocked view events that cause the image based occupant classification system to malfunction when the image sensor obtains a valid image; and
  a plurality of occupant out of view events that cause the image based occupant classification system to malfunction when the image sensor obtains a valid image.

9. The method of claim 1 wherein the plurality of second physical events comprises:
  a plurality of poor field of view issues that cause the image sensor to obtain an invalid image; and
  a plurality of lens faults that cause the image sensor to obtain an invalid image.

10. A method for testing an image based occupant classification system comprising an image sensor, the method comprising:
  constructing a fault tree that includes:
    a plurality of lighting issues that cause the image based occupant classification system to malfunction when the image sensor obtains a valid image;
    a plurality of blocked view events that cause the image based occupant classification system to malfunction when the image sensor obtains a valid image;
    a plurality of occupant out of view events that cause the image based occupant classification system to malfunction when the image sensor obtains a valid image;
    a plurality of poor field of view issues that cause the image sensor to obtain an invalid image; and
    a plurality of lens faults that cause the image sensor to obtain an invalid image;
  identifying a plurality of test occupants for a vehicle, the test occupants comprising an empty seat, a child seat, and a seated adult;
  randomly selecting one of the plurality of lighting issues, one of the plurality of blocked view events, one of the plurality of occupant out of view events, one of the plurality of poor field of view issues, and one of the plurality of lens faults from the fault tree;
  randomly selecting a test occupant from the plurality of test occupants;

physically introducing the randomly selected lighting issue, the randomly selected blocked view event, the randomly selected occupant out of view event, the randomly selected poor field of view issue, the randomly selected lens fault, and the randomly selected test occupant to the image sensor at different times;

operating the image sensor to facilitate determination of an occupant characteristic by the image based occupant classification system for each of the randomly selected lighting issue, the randomly selected blocked view event, the randomly selected occupant out of view event, the randomly selected poor field of view issue, the randomly selected lens fault, and the randomly selected test occupant;

determining whether the image based occupant classification system properly identified a characteristic of the test occupant for each of the randomly selected lighting issue, the randomly selected blocked view event, the randomly selected occupant out of view event, the randomly selected poor field of view issue, the randomly selected lens fault, and the randomly selected test occupant;

calculating a failure rate of the image based occupant classification system; and reconfiguring an algorithm of the image based occupant classification system when the failure rate is above a predetermined level.

11. The method of claim 10 further comprising identifying a driving condition and introducing the driving condition to the image based occupant classification system.

12. The method of claim 11 wherein introducing the driving condition comprises operating a vehicle according to the driving condition, wherein the vehicle includes the image based occupant classification system.

13. The method of claim 10 wherein identifying the plurality of test occupants comprises compiling a list of the plurality of test occupants.

14. The method of claim 10 wherein randomly selecting one of the plurality of lighting issues, one of the plurality of blocked view events, one of the plurality of occupant out of view events, one of the plurality of poor field of view issues, and one of the plurality of lens faults from the fault tree, and randomly selecting a test occupant comprises employment of a randomizer.

* * * * *

UNITED STATES PATENT AND TRADEMARK OFFICE
CERTIFICATE OF CORRECTION

| | | |
|---|---|---|
| PATENT NO. | : 8,195,356 B2 | Page 1 of 1 |
| APPLICATION NO. | : 12/247540 | |
| DATED | : June 5, 2012 | |
| INVENTOR(S) | : Brian T. Allen | |

It is certified that error appears in the above-identified patent and that said Letters Patent is hereby corrected as shown below:

Column 1, line 47, change "ti" to --a--;
Column 2, line 46, change "scat" to --seat--;
Column 4, line 61, change "in," to --in--;
Column 5, line 64, change "is" to --as--; and
Column 6, line 31, change "scat" to --seat--.

Signed and Sealed this
Thirty-first Day of July, 2012

David J. Kappos
*Director of the United States Patent and Trademark Office*